(12) United States Patent
Nair et al.

(10) Patent No.: US 11,216,411 B2
(45) Date of Patent: Jan. 4, 2022

(54) TRANSFORMING DATA ASSOCIATED WITH A FILE BASED ON FILE SYSTEM ATTRIBUTES

(71) Applicant: MICRO FOCUS LLC, Santa Clara, CA (US)

(72) Inventors: Sushil Nair, Santa Clara, CA (US); Kevin McLeod, Overgaard, AZ (US)

(73) Assignee: MICRO FOCUS LLC, Santa Clara, CA (US)

(*) Notice: Subject to any disclaimer, the term of this patent is extended or adjusted under 35 U.S.C. 154(b) by 205 days.

(21) Appl. No.: 16/532,738

(22) Filed: Aug. 6, 2019

(65) Prior Publication Data

US 2021/0042262 A1    Feb. 11, 2021

(51) Int. Cl.
| | | |
|---|---|---|
| G06F 16/28 | (2019.01) | |
| G06F 16/11 | (2019.01) | |
| G06F 21/60 | (2013.01) | |
| G06F 21/62 | (2013.01) | |

(52) U.S. Cl.
CPC .......... *G06F 16/116* (2019.01); *G06F 16/122* (2019.01); *G06F 16/285* (2019.01); *G06F 21/602* (2013.01); *G06F 21/6227* (2013.01)

(58) Field of Classification Search
CPC .............................. G06F 16/116; G06F 16/285
See application file for complete search history.

(56) References Cited

U.S. PATENT DOCUMENTS

| | | | |
|---|---|---|---|
| 6,292,900 B1 | 6/2001 | Ngo et al. | |
| 9,071,542 B2 | 6/2015 | Jackowski et al. | |
| 9,582,444 B1* | 2/2017 | Kumar | G06F 3/067 |
| 2006/0020907 A1* | 1/2006 | Tonami | G06F 9/4401 717/100 |
| 2009/0300712 A1 | 12/2009 | Kaufmann et al. | |
| 2011/0264635 A1 | 10/2011 | Yang | |
| 2011/0314279 A1* | 12/2011 | Ureche | H04L 9/3234 713/167 |
| 2012/0331135 A1* | 12/2012 | Alon | H04L 41/044 709/224 |
| 2014/0324708 A1* | 10/2014 | McCauley | G07F 7/1075 705/72 |
| 2016/0330028 A1* | 11/2016 | Lu | H04L 9/3228 |
| 2016/0359955 A1 | 12/2016 | Gill et al. | |
| 2017/0011079 A1* | 1/2017 | Verma | G06F 16/951 |
| 2018/0041477 A1 | 2/2018 | Shaposhnik | |
| 2020/0204589 A1* | 6/2020 | Strogov | H04L 63/101 |
| 2020/0241849 A1* | 7/2020 | Marthala | G06F 8/51 |
| 2020/0265298 A1* | 8/2020 | Leobandung | G06N 3/0454 |
| 2020/0349021 A1* | 11/2020 | Meadowcroft | G06F 11/1471 |

OTHER PUBLICATIONS

IBM Security; "IBM Big Fix, Endpoint Security and Management"; Resemble Systems; IBM copyright 2015; 66 pp.

* cited by examiner

*Primary Examiner* — Eliyah S. Harper

(57) ABSTRACT

A technique includes intercepting, by a computer, an input/output (I/O) request that is directed to a file; and in response to the interception of the I/O request, accessing, by the computer, file system attributes that are associated with the file and are stored separately from the file. The technique includes classifying, by the computer, the I/O request based on the file system attributes; and performing, by the computer, a data transformation that is associated with the file based on the classification.

20 Claims, 9 Drawing Sheets

TRANSFORMING DATA ASSOCIATED WITH A FILE BASED ON FILE SYSTEM ATTRIBUTES

BACKGROUND

Digital files may have associated access rights, which may be enforced using a number of different mechanisms. One way to control access to a digital file is through the use of credentials that are enforced by a particular computer system. Another way to control access is by controlling the content of the file. For example, the content of the file may be encrypted, and the protected, encrypted content may be protected from being decrypted, except by specified groups or people.

DETAILED DESCRIPTION

Figure 1:
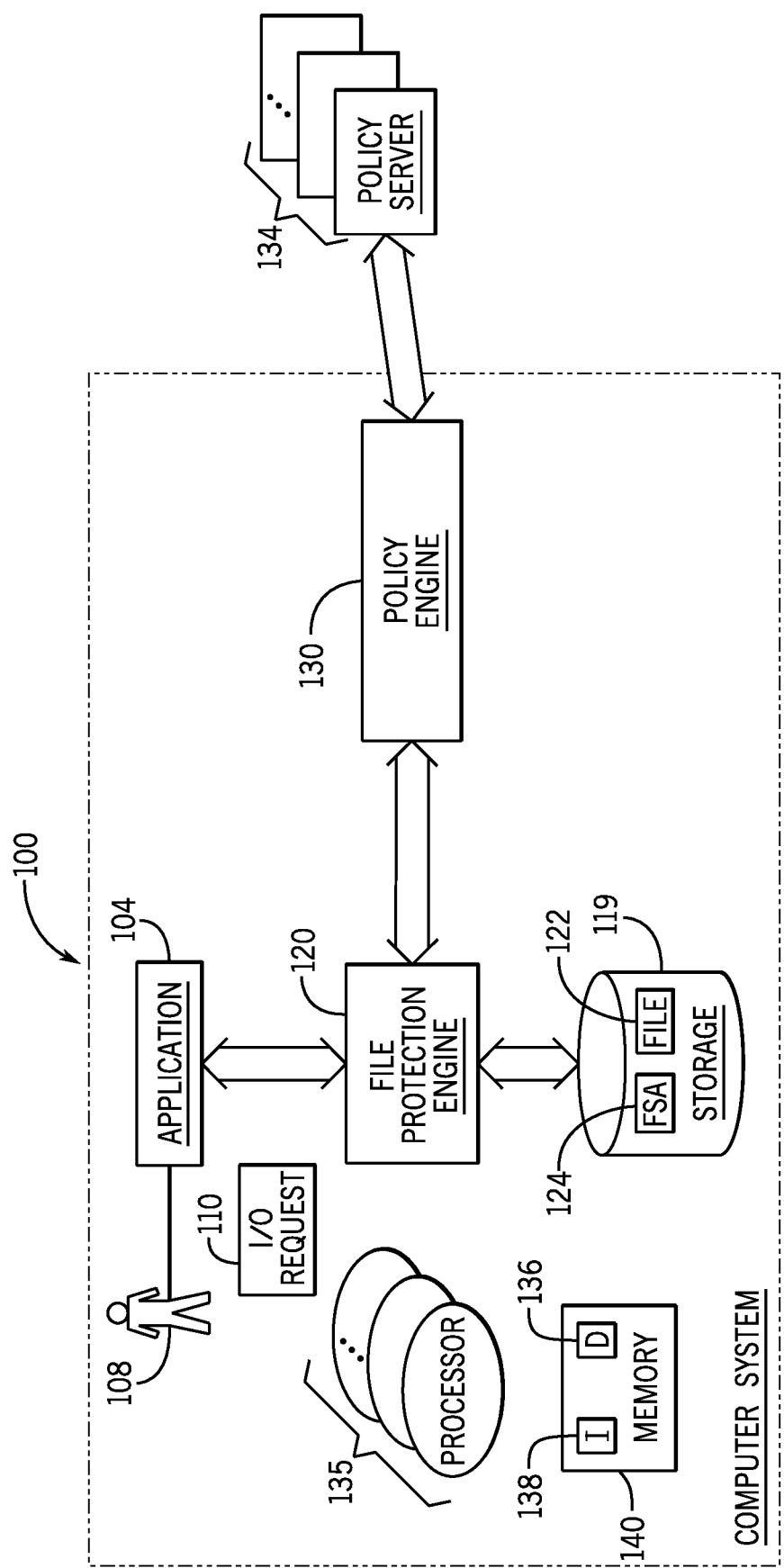
FIG. 1 is a schematic diagram of a computer system having a data protection engine and a policy and application control engine to transparently protect and unprotect data associated with files according to an example implementation.

One way to protect and control access and usage of files on a particular machine (e.g., a server, a desktop computer, a client and so forth) is to define permissions to the files through a security software interface and enforce the permission using the operating system kernel of the machine. For a distributed environment, a security domain may be established over a group of trusted and authenticated machines (e.g., machines of a datacenter) such that the operating systems of these machines cooperatively enforce the site policies. However, this approach is susceptible to data leakage, which is the unauthorized transfer of file content outside of the security domain. In this manner, if a protected file is sent outside of the security domain, then the site policies of the security domain are no longer in place to control access and usage of the file.

Another approach to protecting and controlling access and usage of files is to encrypt the content of the files. For purposes of preventing data leakage, full disk encryption may be used. Data leakage prevention is only guaranteed, however, within an uncompromised system. Full disk encryption does not provide anonymization protection after the file is decrypted, copied and distributed.

In general, an operating system may have a relatively limited set of controls to regulate how a particular file may be accessed and used. This opens more avenues for data leakage.

In accordance with example implementations that are described herein, data content of files is transparently protected before the data content is stored in storage (e.g., hard drives, non-volatile memory), and the data content is transparently unprotected after the data content is retrieved from storage and provided to the user. In this context, "transparently" protecting or unprotecting data content of a file refers to, in response to performing activities on a machine to protect or unprotect the data content without these activities being observed by the user whose activities cause the file to be accessed. As used herein, a "file" refers to a self-contained collection of data, which may be accessible by an operating system or any of a number of different programs (application programs, for example). In accordance with example implementations, the files may have associated file names with file extensions, such as ".doc," ".docx," ".pdf," and so forth.

As described further herein, the access and usage of the data content is protected in a way that persistently protects the data content, as the file is disseminated, thereby inhibiting, if not preventing, data leakage. More specifically, in accordance with example implementations, the protection of the access and usage of the data content includes processing input/output (I/O) requests to files. In this manner, in the course of interacting with a computer program (e.g., a database application, a word processing application, a file explorer utility, and forth), a user may cause the computer program to generate I/O requests to access files. As examples, the I/O requests may be requests to open files, read data content from files, write data content to data files, and so forth. In general, if allowed to proceed, an I/O request involves retrieving data content from storage or storing data content to storage.

In accordance with example implementations, the processing of a given I/O request to a file includes intercepting and classifying the I/O request in a transparent manner. The classification is based on attributes of the file. In general, a "file attribute" refers to metadata that is associated with a file and defines file system behavior with respect to the file. As a more specific example, in accordance with some implementations, the file attributes are stored separately from the file itself and may be "extended file system attributes." An "extended file attribute" (also called an "extended attribute" herein) refers to metadata for a file that may not be interpreted by the file system, as compared to the regular file attributes that have meanings defined by the file system.

At least one of a file control policy or a data protection transformation is selected based on the classification, in accordance with example implementations. The file control policy refers to regulating access to content of the file (whether transformed or not, as further described below). As examples, file control policy may control whether all of the content of the file may be accessed, whether certain parts of the file content of the file may be accessed, whether content of the file may be copied, whether content of the file may be printed, whether content of the file may be read, whether the content of the file may be changed, and so forth.

The data protection transformation is applied to content of the file in transit (on its way to or from storage). As examples, the data protection transformation may be a cryptography transformation (e.g., for a read I/O request, a transformation to decrypt the data content or, for a write I/O request, a transformation to encrypt the data content), a pseudonymization transformation (e.g., for a write I/O request, a transformation to substitute tokens for protected data, such as credit card numbers or social security identifications), and so forth.

The techniques and systems that are described herein provide persistent protection for files, which aids in continuously protecting, monitoring and destroying documents that may be disseminated across a network beyond the security domain of a particular machine. The leakage protection involves transforming and controlling the behavior of third-party software so that the access policy dictates the access to the content of the file. These policies can therefore be performed wherever the file is distributed. As described herein, the techniques and systems that are described herein may be performed on a wide variety of server and desktop operating systems and may use unique trusted features, such as secure enclaves, that are offered by microprocessors.

Referring to FIG. 1, as a more specific example, a computer system 100 may include a file protection engine 120 that responds to file I/O requests that are directed to files (such as exemplary I/O request 110 that is directed to an exemplary file 122) to transparently protect and unprotect the data content of the files. In this regard, in accordance with example implementations, the file protection engine 120 may respond to an I/O request 110 from a requestor (e.g., an application 104 generating the I/O request 110 in response to input from a user 108). The I/O request 110 is a request to perform an I/O operation (e.g., open, read, write, and so forth) on the file 122. The file protection engine 120 classifies the I/O request 110 based on file system attributes 124 that are associated with the file 122 and determines, based on the classification, a control policy to control whether the access requested by the I/O request 110 is allowed; and if access is allowed, the file protection engine 120 may further determine a data transformation to apply to data content of the file 122 based on the classification.

If the I/O request involves writing data content to the file 122 and write access to the file 122 is allowed, the file protection engine 120 applies the determined data transformation to the data content and writes the transformed data content to the file 122. If the I/O request involves reading data content from the file 122 and read access is allowed, the file protection engine 120 applies the determined data transformation to the data content and provides the transformed data content to the requestor.

For the specific example implementation that is depicted in FIG. 1, the computer system 100 includes one or multiple programs, such as the application 104, which may be used by various users, such as exemplary user 108, which have various roles and credentials. The use of these programs may, in general, cause file I/O requests to be generated, such as the I/O request 110.

In accordance with example implementations, the file protection engine 120 communicates with a policy/application control engine 130 (called a "policy engine 130" herein) for purposes of retrieving one or multiple access control and data transformation policies that are associated with the classification. As depicted in FIG. 1, retrieving the policy may involve the policy/engine 130 accessing one or multiple policy servers 134 that are external to the computer system 100. In accordance with example implementations, the file protection engine 120 operates transparently with respect to execution of the application, and based on the retrieved policies, the file protection engine 120 transparently performs the data access controls and data protection transformations according to the policies. As examples, data protection transformations may include cryptography operations (e.g., encrypting file data to be stored in the storage 119 and decrypting file data retrieved from the storage 119), pseudonymization (i.e., substituting pseudonyms, or tokens, for sensitive data), and so forth. As examples, the data access controls may include prohibiting printing of the file 122, prohibiting copying of the file 122, controlling access to selected portions of the file 122, denying access to the file 122, preventing modification of the file 122, and so forth.

As depicted in FIG. 1, in accordance with example implementations, the computer system 100 is an actual physical machine that includes actual hardware and machine executable instructions (or "software"). As an example, the computer system 100 may be a server, a client, a desktop computer, a tablet computer, a web server, a wearable computer, a portable computer, a smartphone, a thin client, a rack-mounted computer, a blade-based computer, a cluster of computers, and so forth. As depicted in FIG. 1, the computer system 100 may include such hardware one or multiple processors 135, a memory 140, mass storage devices (e.g., non-volatile memory devices, hard disk drives, and so forth) that form the storage 119, network switches, network interface controllers, drive controllers, I/O devices, and so forth.

In accordance with example implementations, the processor 135 may include one or multiple central processing units (CPUs), one or multiple CPU processing cores, and so forth. In general, the memory 140 is a non-transitory memory that may be formed from, as examples, semiconductor storage devices, phase change storage devices, magnetic storage devices, memristor-based devices, a combination of storage devices associated with multiple storage technologies, and so forth. Regardless of its particular form, the memory 140 may store various data 136, such as data representing anonymized data content for files, deanonymized content for files 122, data protection transformation policies for files, file access control policies, file system attributes, extended file system attributes, and so forth. Moreover, the memory 140 may store machine executable instructions 138 that, when executed by the processor(s) 134, cause the processor(s) 134 to form one or multiple components of the computer system 100, such as, for example, the file protection engine 120, the policy engine 130, and so forth.

In accordance with some implementations, the processor 134 may be a hardware circuit that does not execute machine executable instructions. For example, in accordance with some implementations, the file protection engine 120 and/or the policy/application control engine 130, may be formed in whole or in part by an application specific integrated circuit (ASIC), a field programmable gate array (FPGA), and so forth. Thus, many implementations are contemplated, which are within the scope of the appended claims.

Figure 2:
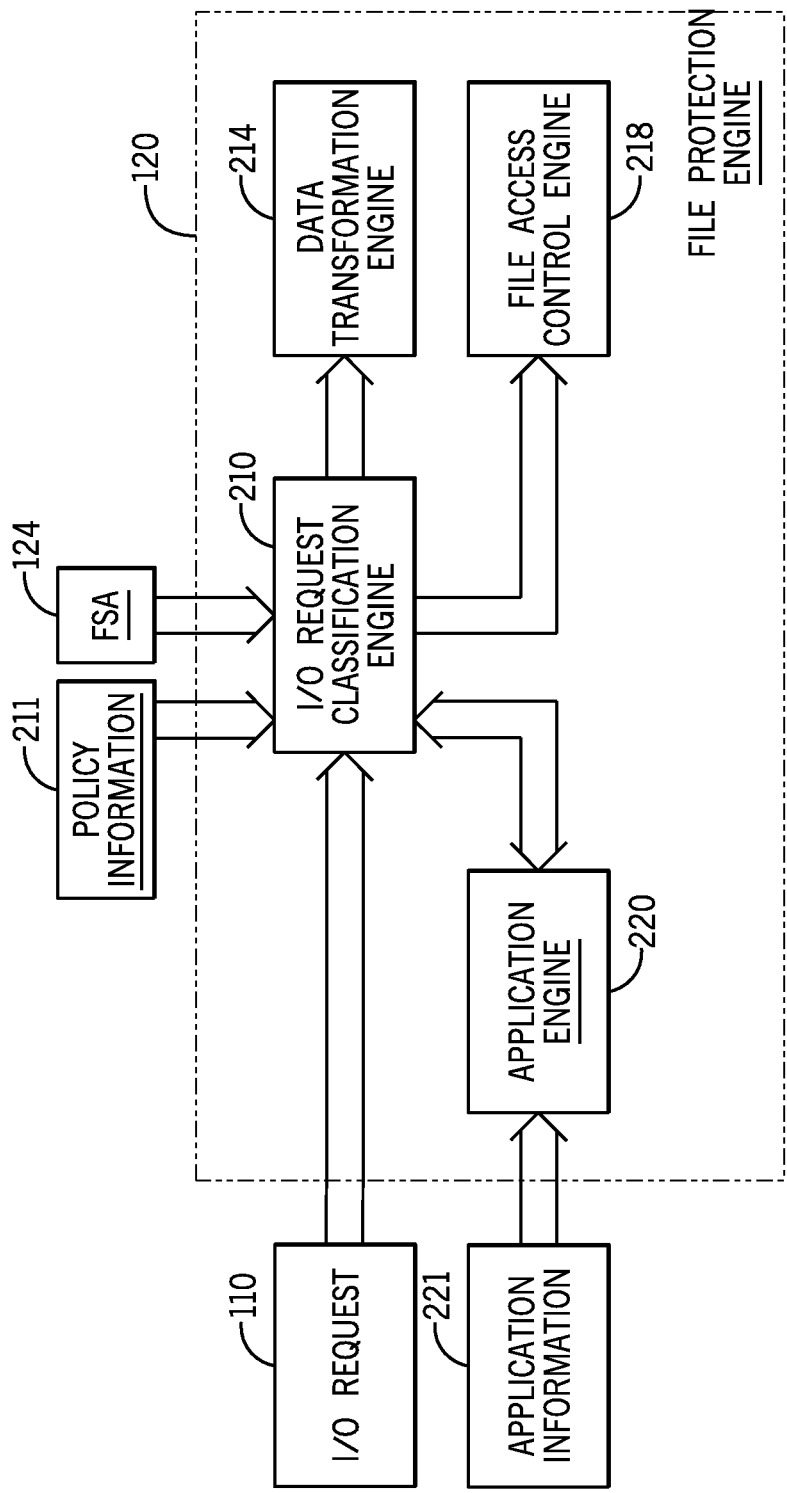
FIG. 2 is an illustration of a process to intercept, classify and perform transformations and controls of input/output (I/O) requests according to an example implementation.

Referring to FIG. 2, in accordance with some implementations, the file protection engine 120 may have an architecture, which includes an I/O request classification engine 210, a data transformation engine 214, a file access control engine 218 and an application engine 220. The I/O request classification engine 210 is constructed to intercept an I/O request 110 that targets a file 122 and classify the I/O request 110 based on file system attributes 124 that are associated with the file 122, policy information 211 (provided by the policy engine 130 (see FIG. 1)) and application information 221 that is gathered by the application engine 220. The application information 221 is identifying formation about the particular application (application name, version, and so forth) that generated the I/O request 110. The classification by the I/O request classification engine 210 controls the data transformation and file access control that are applied by the data transformation engine 214 and file access control engine 218, respectively.

Figure 3:
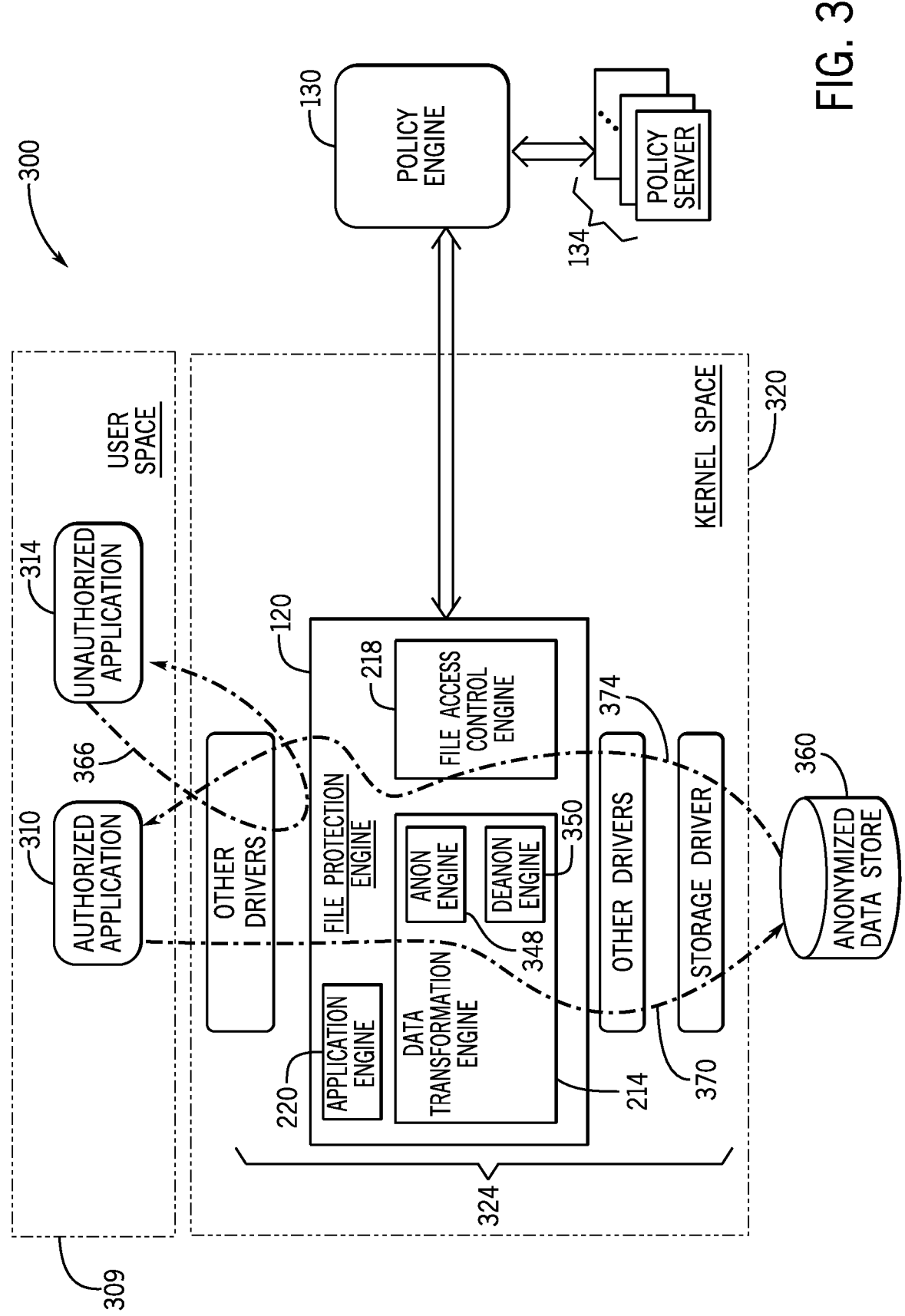
FIG. 3 is a schematic diagram of a stackable filter module-based approach to intercept and classify I/O requests according to an example implementation.

Depending on the particular implementation, the file protection engine 120 may be implemented using components that are exclusively disposed in an operating system kernel space layer, using components that are exclusively disposed in a user space layer, or using a combination of operating system kernel space and user space components. More specifically, referring to FIG. 3, in accordance with some implementations, a stackable filter module-based architecture 300 may be used. In particular, FIG. 3 depicts I/O request flows 366 and 370 that are associated with an unauthorized application 314 (which generates an unauthorized I/O request) and an authorized application 310 (which generates an authorized I/O request), respectively. The authorized application 310 and the unauthorized application 314 are part of a user space layer 309, and for this particular implementation, a kernel space layer 320 of an operating system controls access to the requested files.

More specifically, in accordance with some implementations, the kernel space layer 320 includes various stacked filter layers 324 that are associated with kernel-disposed drivers, and a particular filter layer 324, for this example, forms the file protection engine 120 is used to filter and classify I/O requests that may be provided by applications, such as, here, authorized application 310 and unauthorized application 314. In this manner, an application may call into the operating system kernel to perform an I/O request on behalf of the calling application. The I/O request is then handled by an I/O manager component of the kernel layer 320. In general, the I/O manager, depending on the type of I/O requested, forwards the request to file systems or to other operating system components, such as the memory or cache manager.

For the specific example that is depicted in FIG. 3, the kernel layer 320 provides a way to intercept I/O requests and modify the requests within in its file systems or as an extension to the file systems. In particular, the interception is accomplished by the file protection engine 120 defining callback functions that are invoked whenever an activity of interest is recognized. The file protection engine 120 filters I/O requests based on associated file system attributes and attributes of the application generating the I/O requests for purposes of classifying the I/O requests and thereby recognizing an activity of interest. The file protection engine 346 may call the policy engine 130 (located outside of the kernel layer 320, for example), which may then contact one or multiple policy servers 134 for purposes of accessing one or multiple policies that are associated with the classification.

The application engine 220 informs file protection engine 120 as to the particular application that issues a particular I/O request. In this manner, depending on the particular policy, identifying the specific application may be important to the data transformation and controls that are placed on the I/O request. For the example implementation that is depicted in FIG. 3, as depicted by I/O request flow 370, an I/O request from the authorized application 310 passes through the layer 324 associated with the file protection engine 120, and the file protection engine 120 classifies the request and enforces a policy (via the file access control engine 218) that allows the authorized application 310 to access a file on an anonymized data store 360. Depending on the associated data transformation policy, the data transformation engine 214 may then perform a data transformation of the data content for the file. For example, as depicted in FIG. 3, for a read access, the data transformation engine 214 may include a deanonymization engine 350 to deanonymize the data content (e.g., decrypt the data), and for a write access, the data transformation engine 214 may include an anonymization engine 348 to anonymize (e.g., encrypt) the data content.

FIG. 3 also depicts the unauthorized program 314 attempting to access the file through an I/O request. However, because the unauthorized program 314 does not fall within the policy for accessing the anonymized data, as depicted by I/O request flow 366, the file protection engine 120 rejects the request, i.e., denies access to the anonymized data store 360. As an example, the unauthorized application 314 may belong to a particular class of applications and/or may be associated with a particular role that is not allowed to access certain files stored in the data store 360.

In accordance with some implementations, the file protection engine 120 may allow access to certain parts of a particular file and not allow access to other parts of the file. For example, a particular file may include sensitive information (e.g., salary information, social security numbers, and so forth), and depending on the particular policy (e.g., a policy that is a function of one or multiple factors, such as the class of the program, the credentials of the user using the program, and so forth) associated with the file, the program may not be allowed to access the sensitive parts of the file.

Figure 4:
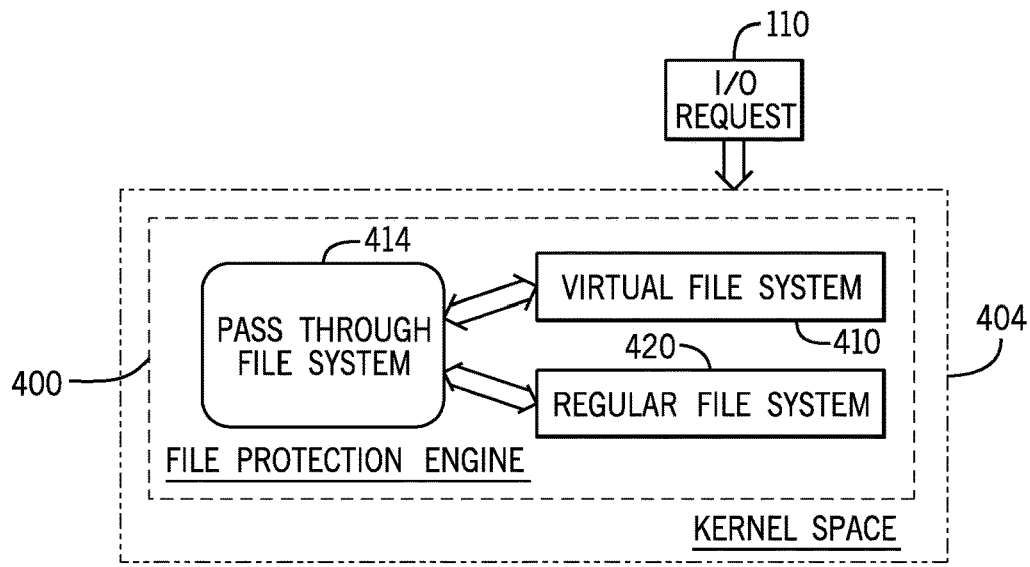
FIG. 4 is a schematic diagram of a pass-through file system-based approach to intercept and classify I/O requests according to an example implementation.

It is noted that not all operating systems may offer a mechanism to filter I/O requests directed to the operating system's file system. Referring to FIG. 4, in accordance with further example implementations, a file protection engine 400 may be used in place of the file protection system 120. The file protection system 400 includes a pass-through file system 414 that may be located in an operating kernel space 404 and may be a stackable vnode feature that allows the interception of I/O request of interest and the processing of these requests using a virtual file system 410 in lieu of forwarding the requests to a regular file system 420. As illustrated in FIG. 4, an I/O request 110 may be passed to the pass-through file system 414, and depending on the particular classification made by the pass through file system 414, the I/O request 110 may then be either processed through a virtual file system 410 (i.e., the data transformation and access control for certain files may be controlled) or passed through to the regular file system 420.

Figure 5:
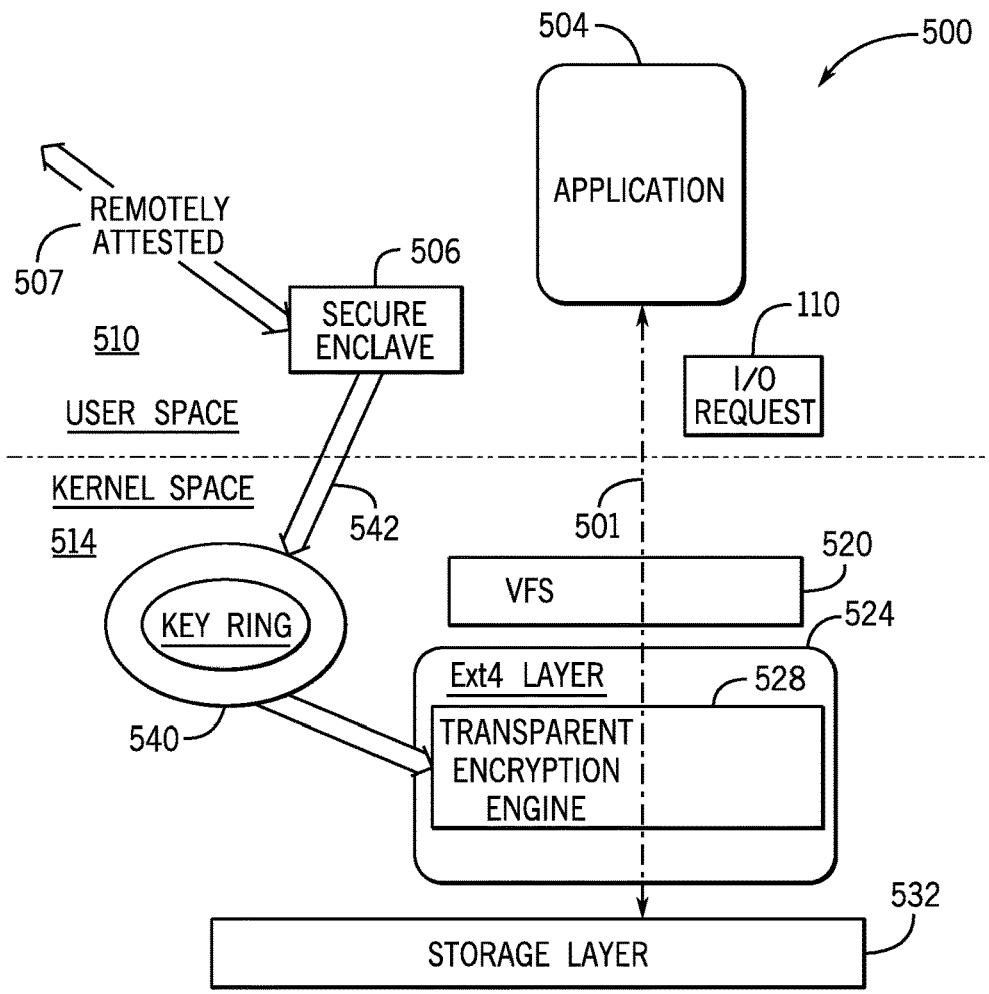
FIG. 5 is a schematic diagram of a transparent encryption-based approach to intercept and classify I/O requests according to an example implementation.

Referring to FIG. 5, in accordance with some implementations, as depicted in architecture 500, the file protection system may include components that are disposed in a user space 510 and in an operating system kernel space 514. For this example implementation, the operating system kernel space 514 includes a transparent encryption engine 528 that is disposed between a virtual file system 520 and storage layer 532. As an example, the transparent encryption engine 528 may be part of an Ext4 layer 524 that is part of the Linux kernel 4.1. An application 504 may issue an I/O request 110 that passes through the virtual file system 520 and is processed by the transparent encryption engine 528. In accordance with some implementations, as depicted in FIG. 5, a secure enclave 506 (of the user space 510), such as an ARM® trust zone or an Intel® secure enclave, may, via remote attestation 507, download master keys and prime a key ring 540 of the kernel space 514 with the keys that are used by the transparent encryption engine 528.

Figure 6:
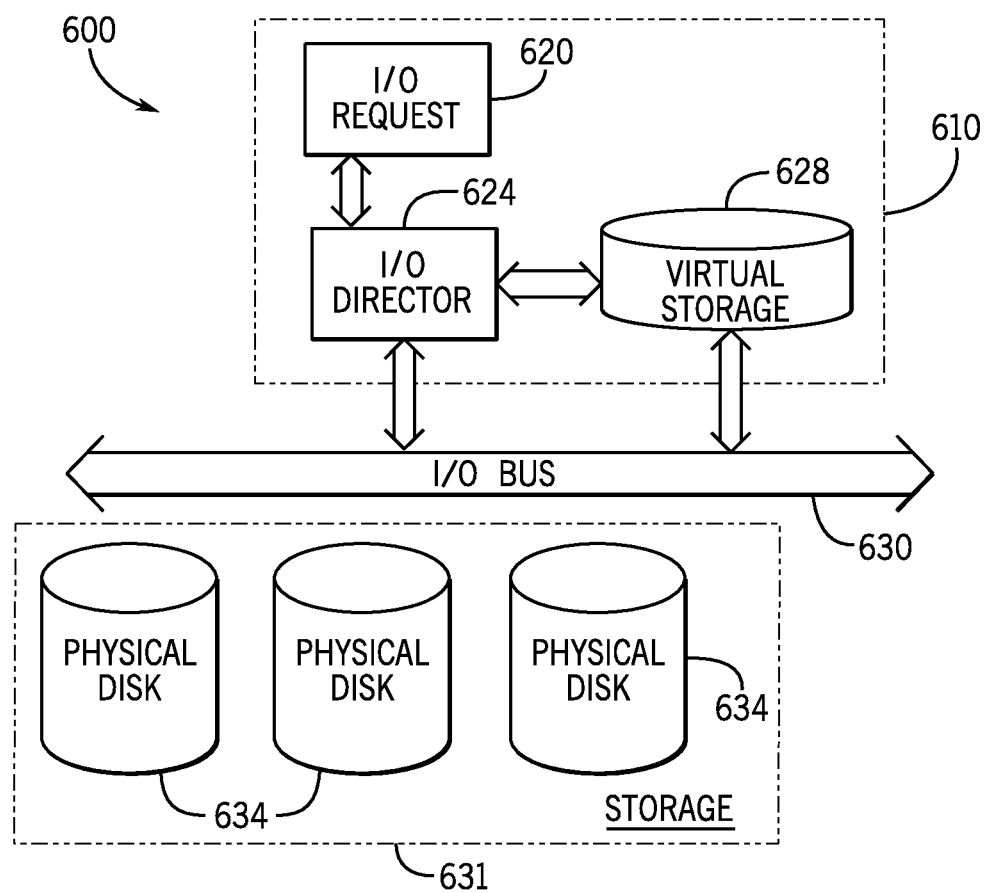
FIG. 6 is a schematic diagram of an approach that uses lower layer storage drivers to intercept and classify I/O requests according to an example implementation.

In accordance with some operating systems, for the interception of I/O activities, it may neither be practical to write a custom file system driver nor filter the I/O activities of interest. For such operating systems, the I/O request may be intercepted further down the I/O stack. More specifically, referring to FIG. 6, in accordance with some implementations, in an architecture 600, an I/O request 620 uses two kernel modules 624 and 628. A first kernel module 624 (called the "I/O director module 624") intercepts the I/O request 620 before the I/O request 620 reaches a storage layer 631 and decides whether the I/O request 620 is of interest or not. If the I/O request is of interest, then the I/O director module 624 routes the request to a second driver layer 628 (called the "virtual storage 628") that operates as a virtual storage disk. The virtual storage 628 may overlay one or more physical disks 634 of the storage layer 631. As the intercepted I/O request transits the virtual storage 628, the virtual storage 628 may transform the I/O activity, depending on the particular classification and profiles associated with the I/O request.

Figure 7:
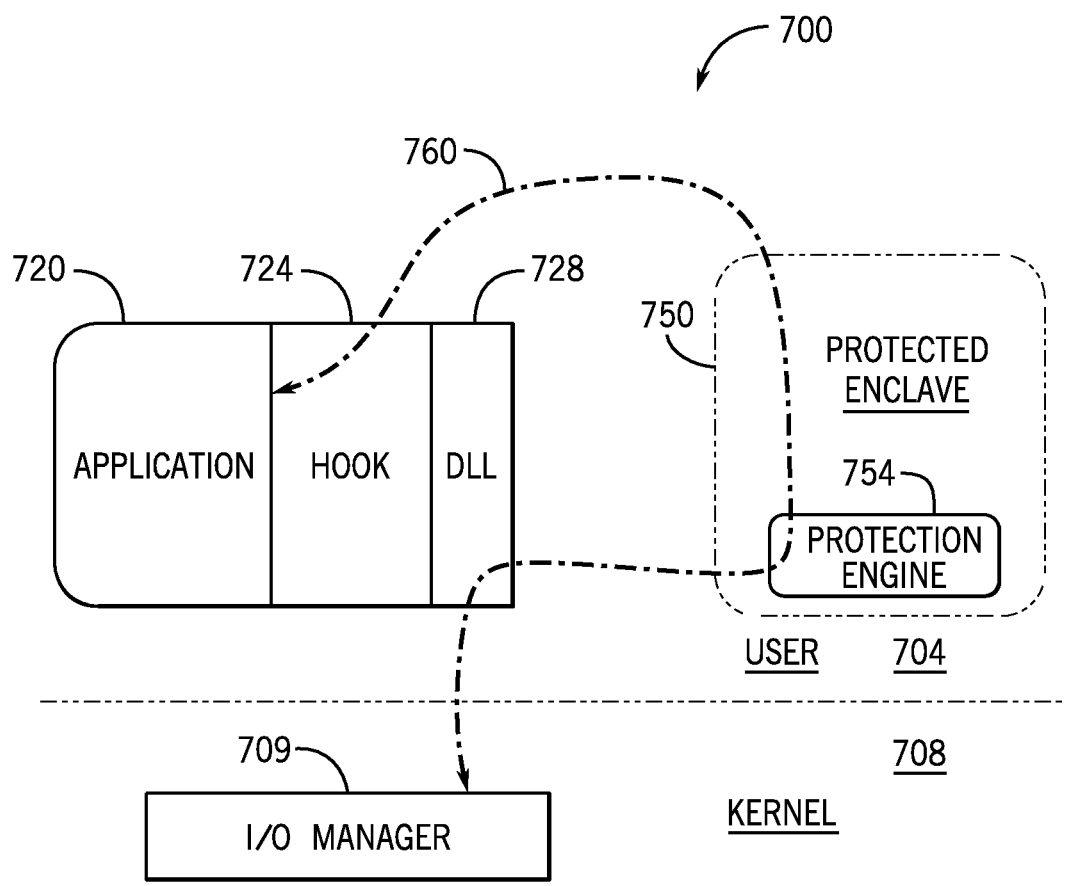
FIG. 7 is an illustration of a user space-based approach to intercept and classify I/O requests according to an example implementation.

Referring to FIG. 7, in accordance with further example implementations, an architecture 700 may be used in which the I/O interception, control and data transformation may be performed entirely in a user space 704. In this manner, it may not be feasible to introduce an interception mechanism in an operating system kernel space 708. This may be because it is relatively challenging to introduce such classification and filtering inside the kernel space or the kernel space 708 may not have the appropriate features. As illustrated in FIG. 7, the user space 704 may include a secure, or protected enclave 750 (e.g., an ARM® trust zone or an Intel® secure enclave). An application 720 may include one or multiple hooks 724, which are hooks into the system or library calls of interest. For the specific example of FIG. 7, the hook 724 may be hooked to a dynamic link library (DLL 728). When a specific call of interest is invoked by the application 720, the hook or hooks enabled by the specific hook code intercept the call. The hook code switches into the protective enclave 750 (as illustrated at reference numeral 760), so that the particular data protection may then be performed without the risk of the keys being leaked. On return from the protective enclave 75, the regular call (the one that was meant to be invoked) may then be performed.

In accordance with example implementations, the classification of the data may be performed by identifying the user and the creator of the file, the application used to create or modify the file, running file specific magic tests, the file names, the extended attributes, the location, scans, and so forth. When a user creates a file using an application, using a set of heuristics, a certain set of tests may be performed and the results are stored in the extended file system attributes for the file.

In accordance with example implementations that are described herein, a persistent protection is applied for files that allow a continuous enforcement of the security policies for the file, even when the file is distributed. For this, the file is continuously accountable to the policy enforcement system so that any changes to the policy or any restrictions to it may be enforced.

In accordance with example implementations, the security policy specifies how the document may be used, modified, transmitted, and so forth. A policy is applicable to a security principal, such as a user, a group, a service or a computer. A combination of authorizations may be used to tightly control access to the file.

As examples, the various types of protection may be enforced on the file:

1. Read, write, execute protections: restrict the authorized user to just read, read and write and execution of the file.
2. Copy: whether a file may be copied.
3. Print: whether the file may be printed. Ability to restrict where it may be printed.
4. Prevent cut and pasting, taking screenshot: this prevents the use of control key based actions as well as the use of screenshot tools.
5. Time: restrict the access to a certain time of day, for a certain number of days, number of accesses within a certain number of days.
6. Location: within the corporate network, office premises, within the country, etc.
7. Auto delete: securely delete after expiration of granted authorization.
8. Audit and Monitor: audit each kind of access. This would also help to track who sends the document to whom.
9. Item wise protection: ability to grant different authorizations to separate parts of the document. Using this, portions of a document could be granted different permissions so that only what the user is authorized to see and modify are accessible.
10. Context specific transparent anonymization: anonymize and de-anonymize based on the application context. An application of this is in how the data stored in the various types of objects managed by a database system may be protected with minimal impact on the performance. This prevents the need for highly intrusive and error prone changes to be done in the applications or the database object definitions. This also helps to ensure that even the backups remain protected irrespective of whether it is stored onsite or shipped offsite.
11. Hardware restrictions: disable or suppress all access to hardware devices that could be used for transmitting or copying.
12. Water mark and anti-screen capture: using this watermark that shows which user had displayed the data. This may be done with clearly evident as well as not easily identifiable display of codes either in the form of color bands or characters. Anti-screen capture techniques ensure that printing a screen is suppressed. This could be done either from the kernel space or from the user space.

Figure 8:
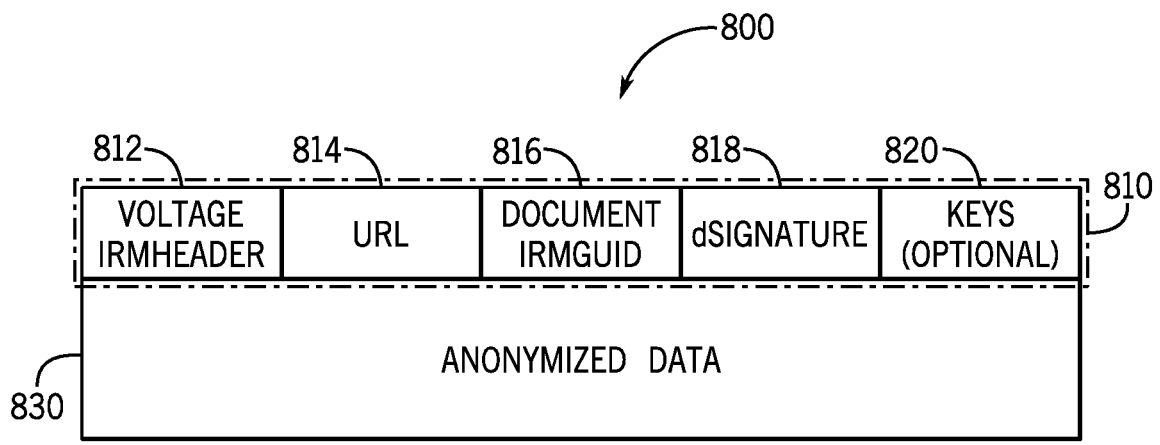
FIG. 8 is an illustration of a file header containing information to be used to access policies for a file according to an example implementation.

In accordance with example implementations, the file may have a specific header, which contains protection specific information that may be used to access the policies that are relevant to the file. For example, FIG. 8 depicts a file 800 that contains a header 810 and an anonymized data portion 830. The header 810 includes a field 812 identifying the header 810; a uniform resource location (URL) 814, which indicates an address for accessing the security policies of the file; a globally unique identifier (GUID) for the document; a digital signature field 818; and a field 820 for zero, one or multiple keys (depending on the implementation). In accordance with some implementations, the header 810 may be unencrypted. The digital signature 818 may contain two signatures: one signature over the entire header 810 and another signature over the data content 830. In accordance with example implementations, the anonymized data may have multiple nested layers of object items, which are individually protected.

When a protected file is sent to another principal, by default, the principal acquires the default permissions granted to be included in the folder. This may be overridden for each of the recipients, in accordance with example implementations. The recipient, depending on the kind of protection to be enforced may have to install one of the above-described data protection engines. When the recipient, after installing the client software, creates a secure environment, the keys may be downloaded and cached safely without risk of leakage. When the recipient tries to open a protected file, the license which includes the policy, keys, and so forth, may be downloaded into the secure enclave. The license may be valid for a site-specified. This may typically be specified by a number of uses and the time for which it remains valid. At the discretion of the administrator or file owner, a license to access the file offline may be offered. Therefore, when the recipient attempts to open the file, the code that has been previously injected during the start of the process is activated and communicates with the policy engine to de-anonymize the data. In certain document editors, a richer experience may be offered using macros that specifically carve out the data to be presented from the display area and displays the de-anonymized data with other protections enabled.

The above-described systems and techniques to control file access and control file data transformation may be used in information rights management applications, as the data files are protected persistently, and the search of and sorting of anonymized data are possible. Without this, especially when using relational databases, the query run time of queries using range operators may grow exponentially. The above-described systems and techniques to control file access and control file data transformation may also be used in server-based applications, such as mail servers and backup servers, as the secure and persistent handling of sensitive documents may be controlled while preventing data leakage Moreover the user space-based implementations that are described herein may be used for sites that cannot install kernel-based solutions.

Figure 9:
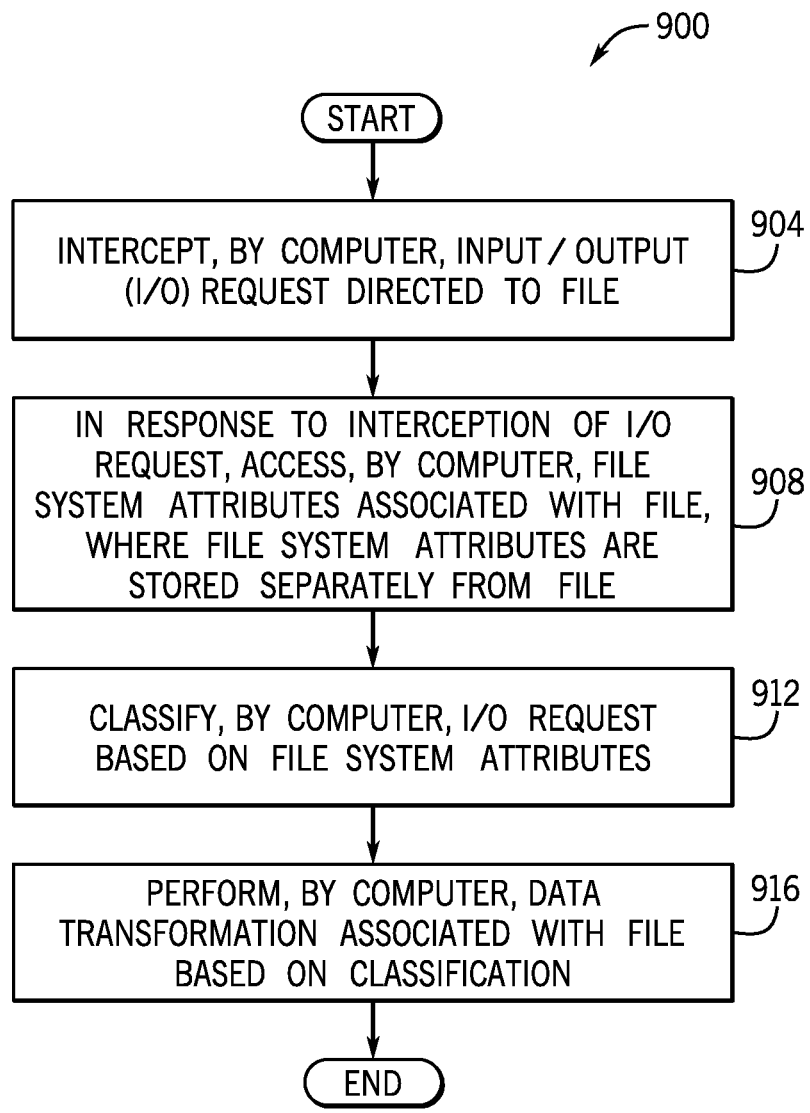
FIG. 9 is a flow diagram depicting a technique to intercept an I/O request, classify the I/O request and perform a data transformation associated with a file based on the classification according to an example implementation.

Thus, referring to FIG. 9, in accordance with example implementations, a technique 900 includes intercepting (block 904), by a computer, an input/output (I/O) request that is directed to a file. In response to the interception of the I/O request, the technique 900 includes accessing (block 908), by the computer, file system attributes that are associated with the file and are stored separately from the file and classifying (block 912), by the computer, the I/O request based on the file system attributes. The technique 900 includes performing (block 916) by the computer, a data transformation that is associated with the file based on the classification.

Figure 10:
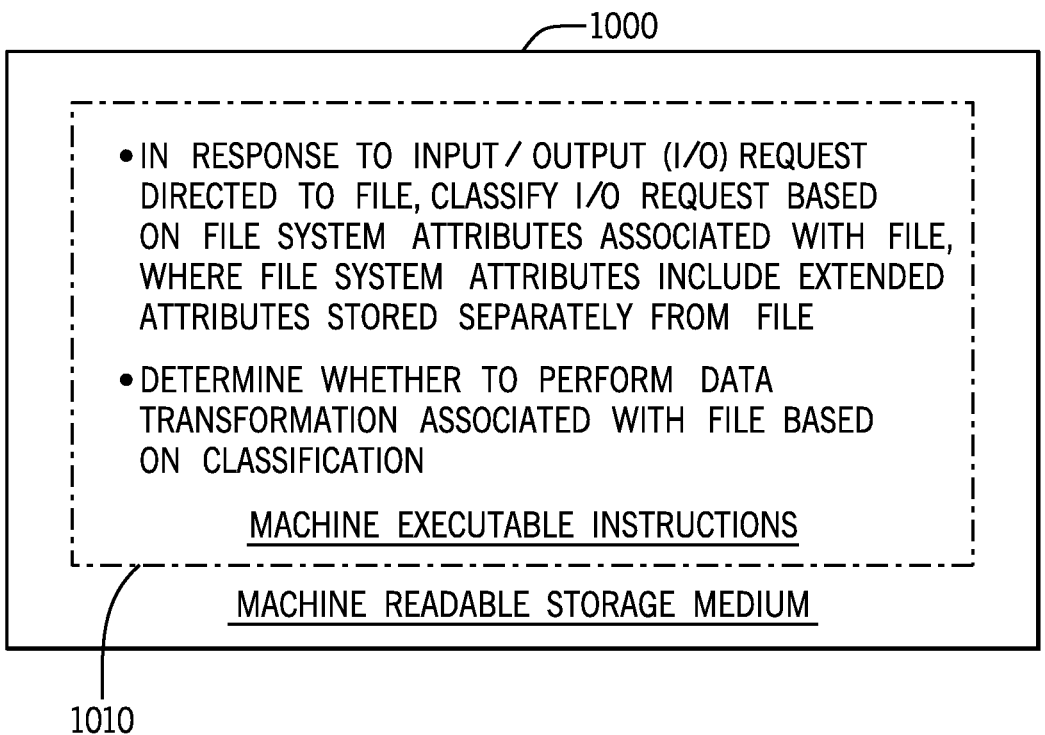
FIG. 10 is an illustration of machine executable instructions that are stored in a machine readable storage medium that, when executed by a machine, cause the machine to classify an I/O request and determine whether to perform a data transformation associated with a file to which the I/O request is directed according to an example implementation.

Referring to FIG. 10, in accordance with example implementations, a non-transitory machine readable storage medium 1000 stores machine readable executable instructions 1010 that, when executed by a machine, cause the machine to, in response to an input/output (I/O) request that is directed to a file, classify the I/O request based on file system attributes that are associated with the file. The file system attributes include extended attributes that are stored separately from the file. The instructions 1010, when executed by the machine, further cause the machine to determine whether to perform a data transformation that is associated with the file based on the classification.

Figure 11:
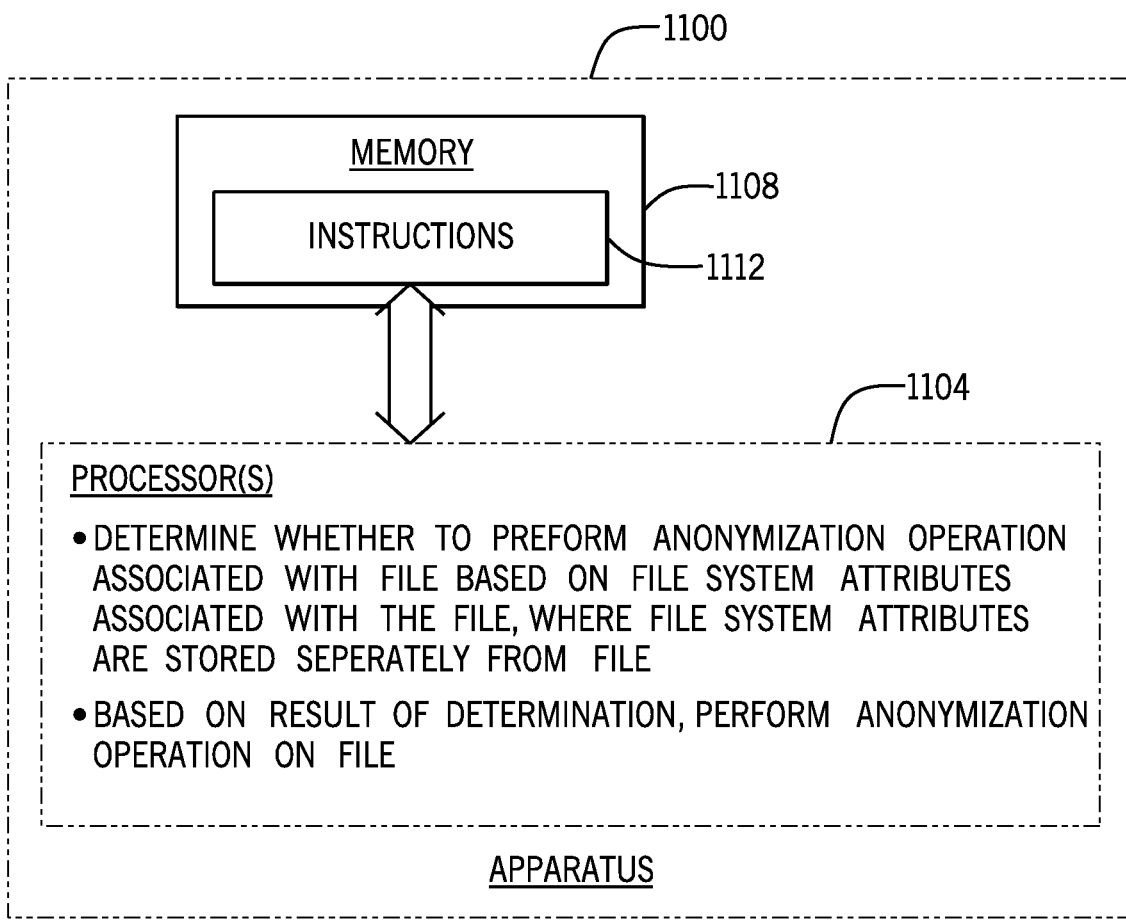
FIG. 11 is a schematic diagram depicting a technique to selectively perform an anonymization operation associated with a file according to an example implementation.

Referring to FIG. 11, in accordance with example implementations, an apparatus 1100 includes at least one processor 1104 and a memory 1108 to store instructions 1112 that, when executed by the processor(s) 1104, cause the processor(s) 1104 to determine whether to form an anonymization operation that is associated with the file based on file system attributes that are associated with the file. The file system attributes are stored separately from the file. The instructions 1112, when executed by the processor(s) 1104, further cause the processor(s) 1104 to, based on a result of the determination, perform the anonymization operation on the file.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   intercepting, by a computer, an input/output (I/O) request directed to a particular file;
   in response to the interception of the I/O request, accessing, by the computer, file system attributes associated with the particular file, wherein the file system attributes are metadata of the particular file and stored separately from the particular file;
   classifying, by the computer, the I/O request based on the file system attributes; and
   performing, by the computer, a data transformation to data of the particular file based on the classification of the I/O request.

2. The method of claim 1, wherein:
   the file system attributes comprise a first attribute representing a creator of the particular file and a second attribute representing an application associated with the I/O request; and
   classifying the I/O request comprises classifying the I/O request based on the first and second attributes.

3. The method of claim 1, wherein:
   classifying the I/O request comprises communicating with a policy server to determine a policy to apply to the I/O request; and
   performing the data transformation comprises performing the data transformation based on the determined policy.

4. The method of claim 1, wherein:
   the classifying identifies a given data part of a plurality of data parts of the particular file; and
   performing the data transformation comprises performing the data transformation on the given data part of the particular file and not performing the data transformation on another data part of the plurality of data parts of the particular file.

5. The method of claim 1, wherein performing the data transformation comprises anonymizing or de-anonymizing the data.

6. The method of claim 1, wherein intercepting and classifying the I/O request comprises using a filtering layer of a plurality of layers of an operating system kernel I/O stack to invoke a callback function associated with the data transformation based on the file system attributes.

7. The method of claim 1, wherein intercepting and classifying the I/O request comprises using a stackable virtual node interface to route the I/O request to a virtual file system associated with the stackable virtual node interface based on the file system attributes.

8. The method of claim 1, wherein the data transformation comprises a cryptography operation associated with a transparent encryption layer of an operating system kernel, the method further comprising:
retrieving a key from an operating system key ring of the operating system kernel in response to the classifying; and
applying the cryptography operation using the key.

9. The method of claim 8, further comprising:
using a user space protected enclave to store the key in the key ring at startup of the computer.

10. The method of claim 1, further comprising:
using a first storage driver to perform the classification of the I/O request;
based on a result of the classification, routing the I/O request to a second storage driver; and
using the second storage driver to emulate the particular file being stored in a virtual storage and perform the data transformation.

11. The method of claim 1, wherein:
the I/O request is generated by execution of an application;
intercepting the I/O request comprises intercepting the I/O request using a hook of the application to redirect the I/O request to a user space protected enclave; and
the classifying and the data transformation are performed within the user space protected enclave.

12. The method of claim 1, wherein the particular file comprises a header and data content, and the header comprises a file identifier and an address of a policy server that stores a policy associated with the particular file.

13. The method of claim 12, wherein the header further comprises a key associated with a data transformation operation associated with the data content and a digital signature.

14. A non-transitory machine readable storage medium storing instructions that, when executed by a machine, cause the machine to:
intercept an input/output (I/O) request directed to a particular file;
in response to the interception of the I/O request, access, file system attributes associated with the particular file, wherein the file system attributes are metadata of the particular file and stored separately from the particular file;
classify the I/O request based on the file system attributes associated with the particular file; and
perform a data transformation on data of the particular file based on the classification of the I/O request.

15. The non-transitory machine readable storage medium of claim 14, wherein the file system attributes comprise one or more of the following:
a creator of the particular file, an application used to create or modify the particular file, a name of the particular file or a location of the particular file.

16. The non-transitory machine readable storage medium of claim 15, wherein the instructions are executable to cause the machine to:
delete the particular file in response to an expiration of a granted authorization to access the particular file, protect a sub-portion of the particular file, preserve anonymization of context specific parts of the application, or control whether a print screen operation may be performed.

17. An apparatus comprising:
at least one processor; and
a memory to store instructions that, when executed by the at least one processor, cause the at least one processor to:
intercept an input/output (I/O) request directed to a particular file;
in response to the interception of the I/O request, access, file system attributes associated with the particular file, wherein the file system attributes are metadata of the particular file and stored separately from the particular file;
classify the I/O request based on the file system attributes associated with the particular file; and
perform a data transformation on data of the particular file based on the classification of the I/O request.

18. The apparatus of claim 17, wherein the instructions, when executed by the at least one processor, further cause the at least one processor to:
identify data parts of the particular file to be protected based on the file system attributes; and
perform an anonymization operation on the identified data parts of the file.

19. The apparatus of claim 17, wherein the instructions, when executed by the at least one processor, further cause the at least one processor to perform the data transformation in a kernel of an operating system.

20. The apparatus of claim 17, wherein the instructions, when executed by the at least one processor, further cause the at least one processor to perform the data transformation in a user space in a secure enclave.

* * * * *